(12) United States Patent
Adkins et al.

(10) Patent No.: US 6,433,218 B1
(45) Date of Patent: Aug. 13, 2002

(54) STABLE ISOCYANATE FORMULATIONS

(75) Inventors: Rick L. Adkins, New Martinsville; William E. Slack, Moundsville, both of WV (US); Edward P. Squiller, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/450,573

(22) Filed: Nov. 30, 1999

(51) Int. Cl.⁷ ............................................. C07C 263/00
(52) U.S. Cl. ........................... 560/338; 528/44; 528/61; 528/64; 560/339
(58) Field of Search ............................. 528/44, 61, 64; 560/338, 339

(56) References Cited

U.S. PATENT DOCUMENTS

| | | | | |
|---|---|---|---|---|
| 5,032,664 A | * | 7/1991 | Frauendorf et al. | 528/49 |
| 5,061,426 A | * | 10/1991 | Frauendorf et al. | 264/205 |
| 5,236,994 A | * | 8/1993 | Markusch et al. | 524/589 |
| 5,302,660 A | * | 4/1994 | Klinksiek et al. | 524/871 |
| 5,610,229 A | * | 3/1997 | Reinehr et al. | 524/589 |
| 6,171,537 B1 | * | 1/2001 | Cohen | 264/211.22 |

* cited by examiner

*Primary Examiner*—Paul J. Killos
*Assistant Examiner*—Taylor V. Oh
(74) *Attorney, Agent, or Firm*—Joseph C. Gil; Lyndanne M. Whalen

(57) ABSTRACT

The pot life of an isocyanate formulation is controlled by including a chain extender having (a) at least two secondary amine groups, (b) no primary amine groups, and (c) a reactivity low enough that the chain extender will not react sufficiently with isocyanate groups present in the isocyanate formulation to increase the viscosity of the isocyanate formulation to more than 2000 mPa·s within 5 seconds in the isocyanate formulation.

7 Claims, No Drawings

STABLE ISOCYANATE FORMULATIONS

BACKGROUND OF THE INVENTION

The present invention relates to stable isocyanate formulations, to a process for the production of such stable isocyanate formulations and to a process for the production of polyurethanes from such stable isocyanate formulations. A key feature of the present invention is the use of a secondary amine-containing chain extender.

Processes for the production of polyurethanes are known. In these processes, two reactive components are generally combined shortly before the polyurethane is to be formed. One of these components is generally a polyisocyanate and the other is composed of at least one isocyanate-reactive material such as a polyol. Either of these components may include additives such as catalysts, chain extenders, cross-linking agents, surfactants, blowing agents, etc. Frequently, these additives are included in the polyol component. However, in cases where the additive may be highly reactive with one or more materials included in the isocyanate-reactive component, that additive is often included in the isocyanate component. Chain extenders containing amine groups are examples of materials that may be included in the isocyanate component.

Amine chain extenders are commonly used in polyurethane-forming reaction mixtures. See, for example, U.S. Pat. Nos. 5,608,000 and 5,637,639. One of the advantages of amine chain extenders is their high reactivity. However, processing problems are encountered with amine chain extenders having a reactivity which is so high that the isocyanate does not have sufficient time to react with other components present. This undesirable pre-reaction adversely affects the polyurethane product.

It would therefore be advantageous to develop a means for controlling the degree of reactivity of an amine chain extender to such an extent that a significant degree of pre-reaction at the expense of other materials present in the chain extender-containing component does not occur before that component is combined with other reactive materials.

SUMMARY OF THE INVENTION

It is an object of the present invention to provide a method for controlling the extent to which an amine chain extender present in an isocyanate formulation reacts with isocyanate groups present in that formulation prior to initiation of the desired reaction.

It is another object of the present invention to provide a stable isocyanate formulation containing an amine chain extender.

It is a further object of the present invention to provide a process for making a stable isocyanate formulation containing an amine chain extender.

These and other objects which will be apparent to those skilled in the art are accomplished by including an amine chain extender having no primary amine groups present therein, having at least two secondary amine groups, and having a low reactivity towards isocyanate groups in an isocyanate formulation. As used herein, "low reactivity" means that the secondary amine group will not react with an isocyanate group sufficiently to cause the viscosity of the isocyanate to increase to more than 2,000 mPa·s (at 25° C.) in less than 5 seconds. In the present application, it is to be understood that "isocyanate formulation" means at least one isocyanate and may optionally include other additives.

DETAILED DESCRIPTION OF THE INVENTION

The present invention is directed to stable polyisocyanate formulations containing an amine chain extender that contains no primary amine groups, has at least two secondary amine groups and a low reactivity with isocyanate groups. These polyisocyanate formulations are particularly useful for the production of polyurethanes.

The polyisocyanates which may be used to produce the stable formulations of the present invention include any of the known diisocyanates, polyisocyanates, prepolymers having at least two terminal isocyanate groups and modified diisocyanates and polyisocyanates. Examples of suitable isocyanates include: any of the isomers of toluene diisocyanate and mixtures thereof ("TDI"); diphenylmethane diisocyanate ("MDI"); polyphenylene polymethylene polyisocyanate ("PMDI"); hexamethylene diisocyanate ("HDI"); isophorone diisocyanate ("IPDI"); and dicyclohexylmethane 4,4'-diisocyanate. Particularly preferred isocyanates are HDI, IPDI, TDI, MDI and dicyclohexylmethane 4,4'-diisocyanate.

Prepolymers having at least two terminal isocyanate groups useful in the practice of the present invention may be prepared by any of the techniques known to those in the art. Suitable prepolymers will generally have an NCO content of from about 15 to about 42%, preferably from about 20 to about 35%. Such prepolymers are typically prepared by reacting an isocyanate with an isocyanate-reactive material in an amount such that a less than stoichiometric amount of isocyanate reactive material is used. Preferred prepolymers for use in the present invention include polyether polyol prepolymers and polyester polyol prepolymers.

Modified diisocyanates and polyisocyanates suitable for use in the practice of the present invention include: allophanate-modified isocyanates, particularly those prepared from monohydroxyl, dihydroxyl and trihydroxyl compounds; biuret-modified isocyanates; and trimers. Methods for producing such modified diisocyanates and polyisocyanates are known to those in the art.

Processes for producing the secondary amine chain extenders suitable for use in the present invention are known. In one suitable method, an alcohol in which the hydrogen of the hydroxyl group has been replaced with a good leaving group (e.g., a mesylate or chloride group) is reacted with a primary amine to form the secondary amine. Suitable alcohols include any compound containing at least 2 hydroxyl groups. The alcohol may have a hydrocarbon or an ether backbone. Preferred alcohols include: 1,4-cyclohexane dimethanol, 2,2-dimethyl-1,3-propanediol, triethylene glycol and tripropylene glycol.

Primary amines that may be used to produce the chain extenders used in the present invention include: tert-octylamine, 2-ethylhexylamine, cyclohexylamine, 2-amino-2-methylpropane, 1-octylamine, 1-butylamine, 1-propylamine, aniline and toluidine. Preferred primary amines include: tert-octylamine, 2-ethylhexyl amine, and cyclohexylamine.

The amine chain extenders used in the present invention are characterized by: (1) the absence of primary amine groups; (2) the presence of at least two secondary amine groups; and (3) a low reactivity with isocyanate groups. The amine chain extenders can not be so reactive with the isocyanate being used that the viscosity of the isocyanate with which it is combined will increase in viscosity to greater than 2,000 mPa·s (at 25° C.) in less than 5 seconds. It is preferred that the chain extender have a reactivity such that the isocyanate viscosity does not exceed 2,000 mPa·s (at 25° C.) for at least 10 seconds, most preferably at least 15 seconds.

Examples of amine chain extenders that are useful in the practice of the present invention include those represented by the formula $$R^1N\ R^2{-}X{-}N\ R^3R^4 \qquad (I)$$

in which

R[1] represents an alkyl group having from 1 to 18 carbon atoms, preferably from 1 to 12 carbon atoms, most preferably from 4 to 8 carbon atoms, a cycloalkyl group having from 3 to 18 carbon atoms, preferably from 3 to 12 carbon atoms, most preferably 6 carbon atoms, or an aryl group having from 4 to 18 carbon atoms, preferably from 4 to 12 carbon atoms, most preferably from 6 to 10 carbon atoms, R[2] represents hydrogen, R[3] represents an alkyl group having from 1 to 18 carbon atoms, preferably from 1 to 12 carbon atoms, most preferably from 4 to 8 carbon atoms, a cycloalkyl group having from 3 to 18 carbon atoms, preferably from 3 to 12 carbon atoms, most preferably 6 carbon atoms, or an aryl group having from 4 to 18 carbon atoms, preferably from 4 to 12 carbon atoms, most preferably from 6 to 12 carbon atoms, R[4] represents hydrogen, X represents an alkyl group having from 1 to 16 carbon atoms, preferably from 1 to 12 carbon atoms, most preferably from 1 to 8 carbon atoms, an aryl group having from 6 to 14 carbon atoms, preferably from 6 to 12 carbon atoms, most preferably from 6 to 10 carbon atoms, or an ether group composed of at least one oxygen and two carbon atoms, preferably one oxygen and four carbon atoms, most preferably two oxygen atoms and 6 carbon atoms.

In the practice of the present invention, the chain extender is usually included in the isocyanate formulation in an amount such that the equivalent ratio of secondary amine groups to isocyanate groups is from about 1 to about 3, preferably from about 1 to about 2, most preferably from about 1 to about 1.

The chain extender required in the practice of the present invention may be incorporated into the isocyanate formulation by simple mixing or by any other technique known to those skilled in the art. After the chain extender has been added to the isocyanate, however, it is preferred that the isocyanate formulation be maintained at a temperature of at least 50° C. In some cases, it is advantageous to agitate or stir the isocyanate formulation at regular intervals.

The isocyanate formulations of the present invention may be reacted with any of the isocyanate-reactive materials known to those in the art. Suitable isocyanate reactive materials include polyols such as polyether polyols and polyester polyols, and polyamines such as polyether polyamines and polyalkyl polyamines.

Having thus described our invention, the following Examples are given as being illustrative thereof. All parts and percentages given in these Examples are parts by weight and percentages by weight, unless other wise indicated.

EXAMPLES

Preparation of Chain Extenders

Chain extenders were prepared by the following procedure. 3 mols of the primary amine indicated in Table 1 below were reacted with 1 mol of the mesylate of the alcohol identified in Table 1 in a flask at 150° C. for 2 hours. The solution was then cooled and neutralized with 50% sodium hydroxide. Excess primary amine and water were vacuum stripped from the mixture and the product secondary amine was filtered and vacuum

TABLE 1

| EXTENDER | ALCOHOL | PRIMARY AMINE |
| --- | --- | --- |
| A | 1,4-cyclohexane-dimethanol | tert-octylamine |
| B | 1,4-cyclohexane-dimethanol | 2-ethylhexylamine |
| C | 2,2-dimethyl-1,3-propane diol | 2-ethylhexylamine |
| D | triethylene glycol | tert-octylamine |
| E | tripropylene glycol | 2-ethylhexylamine |
| F | tripropylene glycol | cyclohexylamine |
| G | tripropylene glycol | tert-octylamine |

Preparation of Polyurethanes

One equivalent of the chain extender indicated in Table 2 was combined with 1 equivalent of the isocyanate indicated in Table 2. The reaction time reported in Table 2 is the amount of time necessary for the isocyanate formulation to reach a viscosity above 2,000 mPa·s (at 25° C.).

TABLE 2

| EXAMPLE | ISOCYANATE | CHAIN EXTENDER | REACTION TIME |
| --- | --- | --- | --- |
| 1 | HDI[1] | 2-methyl-1,5-pentane diamine[2] | <1 second |
| 2 | HDI[1] | A | 35 seconds |
| 3 | HDI[1] | B | 10 seconds |
| 4 | HDI[1] | C | 40 seconds |
| 5 | HDI[1] | D | 40 seconds |
| 6 | HDI[1] | E | 45 seconds |
| 7 | HDI[1] | F | 20 seconds |
| 8 | HDI[1] | G | 21 minutes |
| 9 | TDI[3] | D | 15 seconds |
| 10 | TDI[3] | F | 90 seconds |

[1]Hexamethylene diisocyanate which is commercially available from Bayer Corporation under the name Desmodur N3300.
[2]Commercially available from DuPont under the name Dytek A.
[3]Toluene diisocyanate which is commercially available from Bayer Corporation under the name Mondur TD-80.

Example 1 illustrates a chain extender having primary amine groups. The significance of the primary amine group is evident from the reaction time for the formulation of Example 1 as compared to the reaction times for the secondary amine chain extenders within the scope of the present invention.

The reaction times reported in Table 2 also indicate that the more steric hindrance in the chain extender, the longer the reaction time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for controlling pot life of an isocyanate formulation comprising including a chain extender having
   a) at least two secondary amine groups,
   b) no primary amine group, and
   c) a reactivity low enough that the chain extender will not react sufficiently with isocyanate groups present in the isocyanate formulation to increase the viscosity of the isocyanate formulation to more than 2000 mPa·s within 5 seconds in the isocyanate formulation in an amount such that the desired pot life is attained.

2. The process of claim 1 in which the chain extender has secondary amine groups which do not react with isocyanate groups present in the isocyanate formulation sufficiently to increase viscosity of the isocyanate formulation to greater than 2000 mPa·s for at least 10 seconds.

3. The process of claim 1 in which the chain extender is represented by the formula

in which
- $R^1$ represents an alkyl group having from 1 to 18 carbon atoms, a cycloalkyl group having from 3 to 18 carbon atoms or an aryl group having from 4 to 18 carbon atoms,
- $R^2$ represents hydrogen,
- $R^3$ represents an alkyl group having from 1 to 18 carbon atoms, a cycloalkyl group having from 3 to 18 carbon atoms or an aryl group having from 4 to 18 carbon atoms,
- $R^4$ represents hydrogen, and
- X represents an alkyl group having from 1 to 16 carbon atoms, an aryl group having from 6 to 14 carbon atoms, or an ether group composed of at least one oxygen and two carbon atoms.

4. The process of claim 3 in which in formula (I)
- $R^1$ represents an alkyl group having from 1 to 8 carbon atoms or a cyclohexyl group,
- $R^2$ represents hydrogen,
- $R^3$ represents an alkyl group having from 1 to 8 carbon atoms or a cyclohexyl group,
- $R^4$ represents hydrogen, and
- X represents the residue of 1,4-cyclohexanedimethanol, 2,2-dimethyl-1,3-propanediol, triethylene glycol or tripropylene glycol.

5. The process of claim 3 in which the viscosity of the isocyanate formulation containing the amine chain extender does not reach 2,000 mPa·s for a period of at least 10 seconds.

6. The process of claim 1 in which the isocyanate in the isocyanate formulation is toluene diisocyanate.

7. The process of claim 1 in which the isocyanate in the isocyanate formulation is hexamethylene diisocyanate.

* * * * *